Patented Apr. 2, 1929.

1,707,587

UNITED STATES PATENT OFFICE.

FERNANDO SOMOZA VIVAS, OF LOS ANGELES, CALIFORNIA, ASSIGNOR TO INTERNATIONAL FIREPROOF PRODUCTS CORPORATION, OF NEW YORK, N. Y., A CORPORATION OF DELAWARE.

PROCESS OF PREPARING A FIREPROOFING MATERIAL FOR PAINTS.

No Drawing.  Application filed March 11, 1927.  Serial No. 174,640.

The invention relates to material for fireproofing paints and enamels and has as an object the provision of a material which may be added to paints and enamels when otherwise ready for use to make the same fireproof.

The composition of the material prepared by the process of the invention is as follows:

| | |
|---|---|
| Boric acid | 50 pounds. |
| Borax | 100 pounds. |
| Zinc sulphate | 15 pounds. |
| Sodium tungstate | 10 pounds. |
| Gelatine, glue or the like | 10 pounds. |
| Water | 50 gallons. |
| Asbestine pulp | 150 pounds. |
| Titanium oxide | 50 pounds. |
| Smoke silica | 20 pounds. |
| Fireproof linseed oil | 20 gallons. |

The material is prepared according to the above formula as follows:

Substantially 45 gallons of water is heated to a temperature of about 130° F. and the boric acid is first dissolved therein. Zinc sulphate, borax and sodium tungstate are then added to the solution in the order named, each being thoroughly dissolved before the subsequent addition.

The gelatine is soaked in 5 gallons of water for four or five hours or until thoroughly swelled when it is heated in a steam jacketed kettle and when dissolved is added to the first formed mixture.

After the gelatine has been completely incorporated the asbestine pulp is added, then the titanium oxide and the silica in the order named.

When the elements already added have been mixed to a condition of a homogeneous paste, twenty gallons of fireproof linseed oil are added to the paste thus producing a material which may be added to paint or enamel to make the same fireproof.

The asbestine pulp mentioned in the formula is a well known filler for paints supplied to the market.

The fireproof linseed oil is prepared according to the following formula:

| | |
|---|---|
| Drying oil | 100 gallons. |
| Borax | 100 pounds. |
| Ammonium chloride | 60 pounds. |
| Boric acid | 50 pounds. |
| Tungstate of sodium | 5 pounds. |

The drying oil mentioned in the formula may be tung oil, linseed oil or any equivalent thereof which is commonly used in the preparation of paints.

The materials named in the formula with the exception of the oil are first dissolved in a weight of water equal to their combined weight, being added to the water in the order named and thoroughly dissolved therein and the solution of the materials is then added to and mixed with the oil in a steam jacketed kettle wherein the mixture is heated gradually to a temperature of substantially 250 F. and the heat is maintained until all of the moisture has disappeared, the material being agitated during the operation. The resulting fireproof oil is then ready for use in the first formula.

Of the material prepared according to the first formula named, from six to ten gallons are added to the batch of one hundred gallons of paint or enamel as heretofore prepared ready for use to make the paint or enamel fireproof.

Minor changes in the proportions of the materials named or inconsequent changes in the order of their addition may be made within the scope of the appended claims without departing from the spirit of the invention.

I claim:

1. The process of preparing a fireproofing material for paints and the like which comprises making an aqueous solution of boric acid, borax, zinc sulphate and sodium tungstate, combining a solution of gelatine with said first named solution, adding paint filler to the combined solutions to form a paste and mixing the paste with a fireproof drying oil to substantially the consistency of paint ready for application.

2. The process of preparing a fireproofing material for paints and the like which comprises dissolving in substantially 45 gallons of water and in the order named substantially 50 pounds of boric acid, 15 pounds of zinc sulphate, 100 pounds of borax, and 10 pounds of sodium tungstate, dissolving 10 pounds of gelatine in 5 gallons of water and adding to the first solution, adding to the combined solutions 150 pounds of asbestine pulp, 50 pounds of titanium oxide and 20 pounds of smoke silica and mixing the resulting paste with 20 gallons of fireproof drying oil.

3. The process of producing a fireproof drying oil which comprises dissolving substantially 100 pounds of borax, 60 pounds of ammonium chloride, 50 pounds of boric acid and 5 pounds of sodium tungstate in an equal weight of water, mixing the solution with 100 gallons of drying oil and evaporating the water.

In testimony whereof I affix my signature.

FERNANDO SOMOZA VIVAS.